United States Patent [19]
Ulert

[11] 3,815,949

[45] June 11, 1974

[54] EXPANSIBLE MOBILE HOME

[76] Inventor: Izaak A. Ulert, 3651 Dumbarton, Houston, Tex. 77025

[22] Filed: June 11, 1973

[21] Appl. No.: 368,959

[52] U.S. Cl. ................................ 296/23 C, 52/67
[51] Int. Cl. ............................................. B60p 3/32
[58] Field of Search....... 296/23 C, 23 R, 27; 52/66, 52/67, 64, 143

[56] References Cited
UNITED STATES PATENTS

| | | | |
|---|---|---|---|
| 2,561,921 | 7/1951 | Guillot | 52/67 X |
| 2,636,773 | 4/1953 | Van Tassel | 296/23 R |
| 2,801,878 | 8/1957 | Rawlings | 296/23 C |
| 3,323,778 | 6/1967 | Baker | 296/23 R |

FOREIGN PATENTS OR APPLICATIONS

| | | | |
|---|---|---|---|
| 665,853 | 7/1963 | Canada | 296/23 C |

*Primary Examiner*—Stanley H. Tollberg
*Assistant Examiner*—James M. Slattery
*Attorney, Agent, or Firm*—Fulbright & Crooker

[57] ABSTRACT

An expansible and contractible mobile home, camper or trailer for personal or commercial use has interfitting floor, roof and wall sections, and additional interfitting end floor, roof and wall sections, which move relatively to one another so that it is expansible and contractible in three directions, that is, height, width and length, thereby making it compact and readily transportable yet expandable into a relatively spacious and commodious mobile home, camper or trailer. Means are provided for guidedly moving the sections into expanded and contracted positions, and for releasably securing or clamping the sections in contracted and expanded position.

4 Claims, 8 Drawing Figures

PATENTED JUN 11 1974 3,815,949

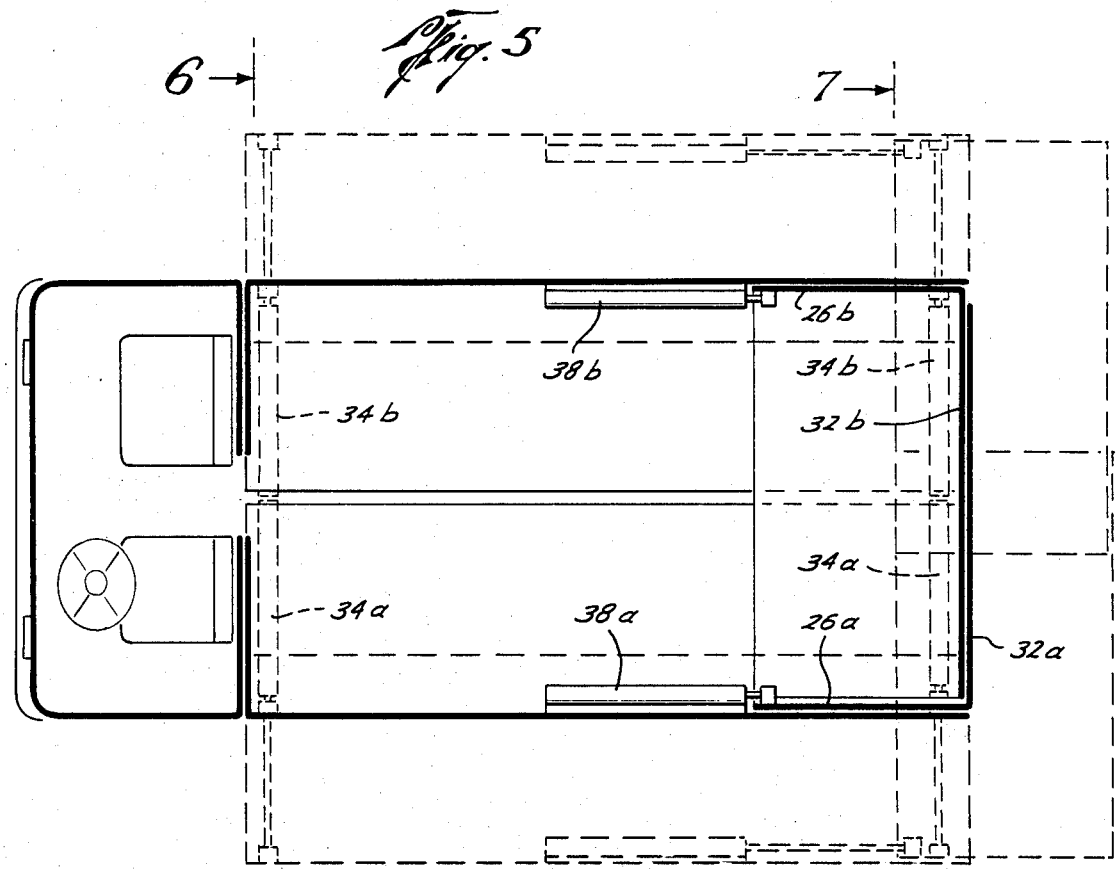
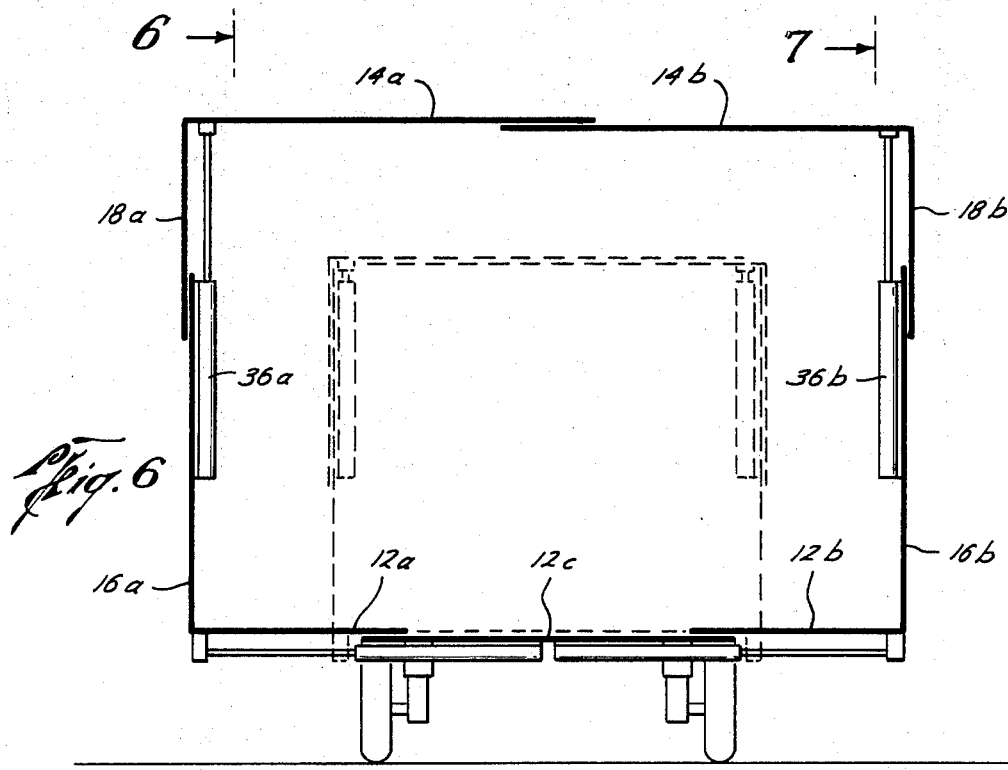

EXPANSIBLE MOBILE HOME

BACKGROUND OF THE INVENTION

While there are mobile homes, campers and trailers which can be expanded from a contracted position during transportation from one location to another, to an expanded position for use, to the inventor's knowledge there is no mobile home, camper or trailer which can be contracted to a compact size as to height, width and length so that it can be readily transported from one site to another site and fit into the usual home garage, yet can be expanded into a relatively spacious and commodious mobile home, camper or trailer by expanding it in height, width and length.

It would be highly advantageous to provide and the present invention is directed to an expansible mobile home, camper or trailer which can be transported, either as a trailer or as an addition to or an integral part of a bus, truck or automobile which when in contracted position is of moderate size and which can readily and easily be expanded in height, width and length thereby providing a spacious and commodious mobile home, camper or trailer yet when contracted is of small enough size that it can be readily transported from location to location. This also applies to a commerical type vehicle for transporting of goods, or for display purposes, or mobile clinic or study purposes.

SUMMARY

The present invention is directed to the provision of an expansible mobile home, camper or trailer which when contracted is of moderate size and easily and readily transported from location to location, but which can be expanded in height, width and length to provide a relatively spacious and commodious mobile home or camper.

It is therefore an object of the present invention to provide an expansible and contractible mobile home, camper or trailer which, when in contracted position, is of moderate size and can be transported either in the form of a camper or bus or towed as a trailer readily and easily from location to location, but is readily and easily expansible into a spacious and commodious mobile home, camper or trailer.

Yet a further object of the present invention is the provision of such an expansible and contractible mobile home, camper or trailer which can readily and easily be expanded in height, width and length to provide a spacious and commodious home or camper, and can readily and easily be contracted in height, width and length to provide a body structure of moderate size which can readily and easily be transported from location to location.

A further object of the present invention is the provision of such a mobile home, camper or trailer which may readily and economically be manufactured and which is of relatively simple construction and light weight.

Still a further object of the present invention is the provision of an expansible and contractible mobile home, camper or trailer which consists of movably interfitting floor sections, roof sections, wall sections and which are movable relative to one another to increase or decrease the height, width and length of the mobile home, camper or trailer.

A further object of the present invention is the provision of such a mobile home, camper or trailer which has interfitting floor, wall and roof sections, means for moving these sections for expansion and contraction and interfitting guides and slides for guiding movement of the sections.

A further object of the present invention is the provision of such a mobile home, camper or trailer including means for releasably securing the floor, wall and roof sections in expanded and contracted position.

Other and further objects, features and advantages of the invention will appear from the several views of the drawings, the description of the preferred embodiment and the claims.

BRIEF DESCRIPTION OF THE VIEWS OF THE DRAWINGS

FIG. 5 is a plane view of the mobile home, camper or trailer of FIG. 1, FIG. 6 is a cross-sectional view taken along the line 6—6 of FIG. 5.

DESCRIPTION OF THE PREFERRED EMBODIMENTS

Figure 1:
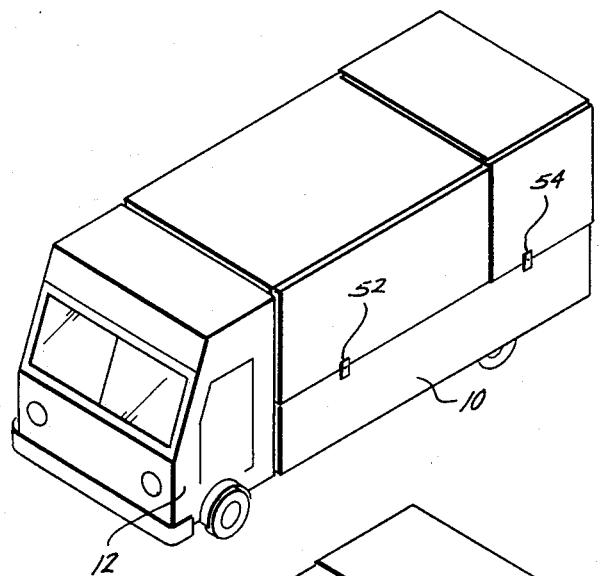
FIG. 1 is a perspective view of a mobile home, camper or trailer shown in the form of an integral bus according to the invention and illustrated in contracted position.

Referring now to the drawings, and particularly to FIG. 1, a mobile home, camper or trailer is illustrated and designated by the reference numeral 10. It is here shown as a self-contained mobile home, with the cab 12. No detailed description is given of the cab and other components of the automobile, bus or truck portions as these are all conventional and the mobile home, camper or trailer may either be separate from, or an integral part of the truck or bus or may be towed as a trailer.

The mobile home or camper 10 is made up of a plurality of floor sections 12a and 12b, which interfit with the floor section 12c and are movable horizontally and transversely, that is, sidewise, with respect to each other and the floor section 12c as best shown in FIG. 6.

Figure 2:
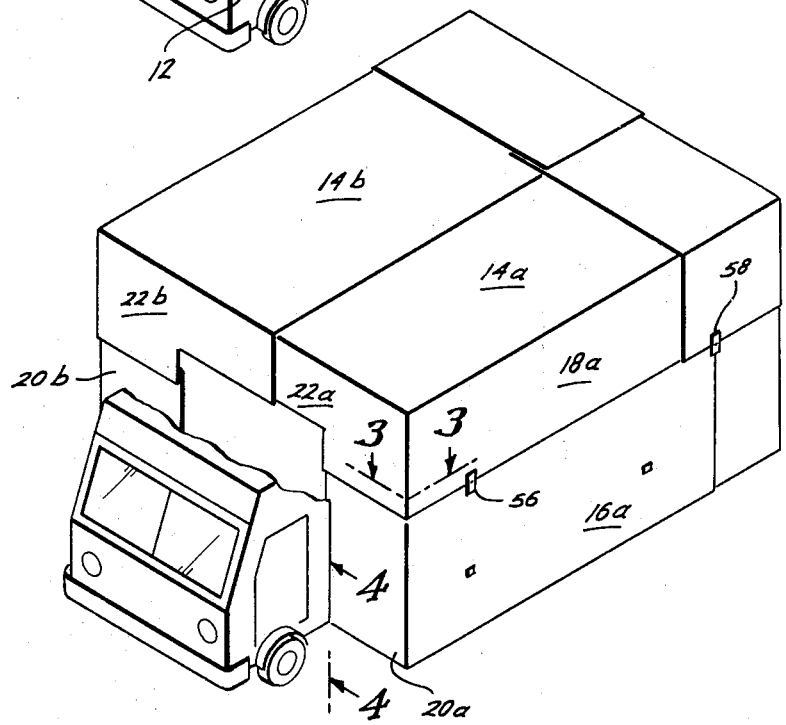
FIG. 2 is a view of the mobile home, camper or trailer of FIG. 1 but illustrated in expanded position.

Similarly, and as illustrated in FIG. 2, the mobile home or camper 10 includes the interfitting roof sections 14a and 14b which are movable horizontally and transversely, sidewise, to and away from one another.

The lower sidewall sections 16a and 16b extend upwardly from adjacent the outer ends of the floor sections 12a and 12b, respectively, and movably interfit with the upper sidewall sections 18a and 18b extending downwardly from the roof sections 14a and 14b, or best shown in FIGS. 2 and 6.

Similarly, and as best seen in FIG. 2, the lower interfitting front wall sections 20a and 20b are movable transversely with respect to one another and are connected to the sidewall sections 16a and 16b (not shown in this view) and the floor sections 12a and 12b. Similarly, the upper interfitting front wall sections 22a and 22b are connected to the forward portions of the roof sections 14a and 14b and upper sidewall sections 18a and 18b, respectively.

As illustrated in FIG. 2, a passageway is provided from the interior of the body 10 to the cab 12 by having portions of the front lower wall sections 20a and 20b and upper front wall sections 22a and 22b cut back. While not shown in FIG. 1, these wall sections are cut back sufficiently so that there is a passageway from the body 10 into the cab 12 when the wall sections are in contracted position. If desired this passageway may be closed by a hinged or sliding door or panel and the like in either or both contracted and expanded positions.

Figure 8:
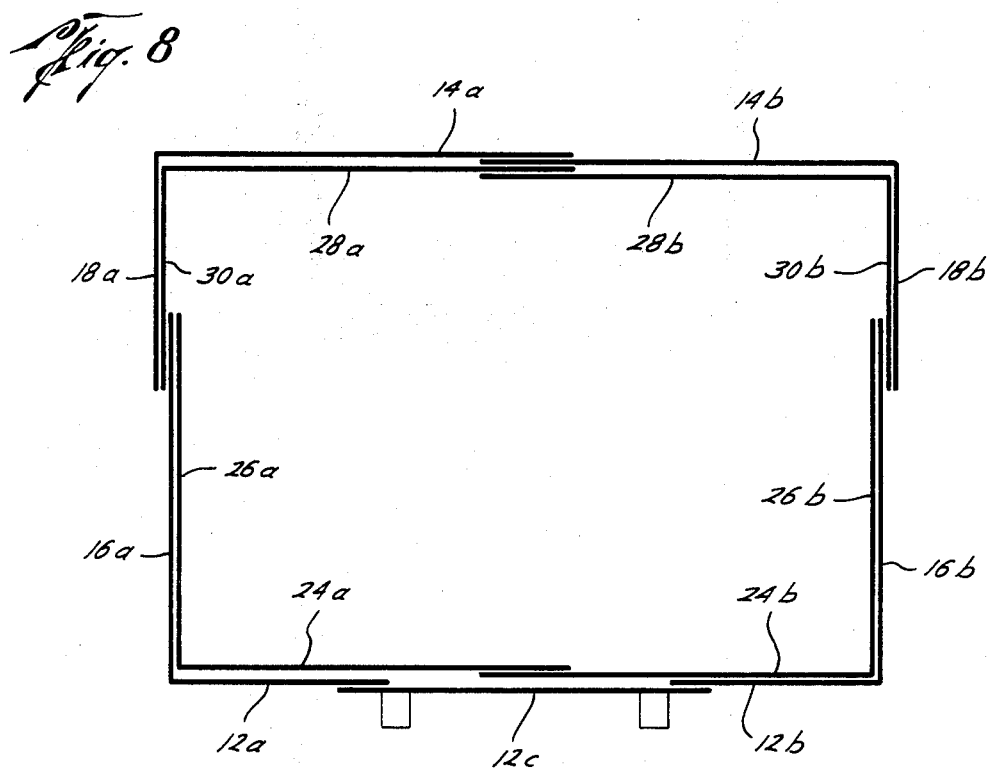
FIG. 8 is a view similar to that of FIG. 7 but illustrates the mobile home, camper or trailer in expanded rather than contracted position.

By the arrangement described so far, the mobile home, camper or trailer is expansible and contractible both as to width and height. In order that the mobile home, camper or trailer 10 may be expanded and contracted also as to length, an additional end section is provided which includes, as best illustrated in FIG. 8, the end floor sections 24a and 24b which interfit and are movable with one another and which also interfit and are movable with the floor sections 12a and 12b. Lower end sidewall sections expend upwardly interiorly of the lower sidewall sections 16a and 16b and are movable longitudinally with respect to them.

Similarly, end interfitting and movable roof sections 28a and 28b are disposed within and movable with respect to the roof sections 14a and 14b and to which are connected adjacent their outer ends the upper end sidewall sections 30a and 30b, respectively. The end roof sections 28a and 28b and their end sidewall sections 30a and 30b are movable longitudinally with respect to the roof sections 14a and 14b and the upper sidewall sections 18a and 18b as well as being movable sidewise and upwardly and downwardly.

As best seen in FIG. 5, the interfitting and movable end rear wall sections 32a and 32b are secured to and extend upwardly from the rear portion of the end floor sections 24a and 24b, to which are secured the sidewall sections 26a and 26b.

Thus, the end section includes floor, roof, sidewall and rearwall sections which accommodate not only expansion and contraction as to width and height but also as to length.

While the end section is shown as being a relatively short section, it may be any length as may be desired and an additional such end section may be utilized at the other end (not shown) if desired.

Thus, the mobile home, camper or trailer 10 by means of the interfitting floor, roof and wall sections and end sections is expandable or contractible in three directions, that is, in height, width and length, to provide a highly compact and readily movable mobile home, camper or trailer which may be transported on normal roads and yet after arriving at location may be expanded into a relatively spacious and commodious mobile home, camper or trailer.

Any suitable means may be utilized to expand and contract the various roof and wall and end sections. As illustrated in FIGS. 5 and 6, to which reference is now made, pairs of hydraulic pistons and cylinders, designated as 34a and 35b, are utilized to expand and contract the sidewall sections by moving the floor sections 12a, 12b, 24a and 25b, and roof sections 14a, 15b, 28a and 28b, as illustrated in FIG. 8. Referring again to FIGS. 5 and 6, pairs of hydraulic pistons and cylinders 36a and 36b are utilized to raise and loer the roof sections by raising and lowering the upper sidewall sections 18a, 18b, 30a and 30b (as seen in FIG. 8) and for lengthening or shortening the mobile home, camper or trailer by extending or contracting the end-wall members 26a and 26b.

No detailed description is given or deemed necessary of the hydraulic piston and cylinder arrangement illustrated as any desired hydraulic system may be utilized, the parts for which are readily available on the market, and suitable hydraulic power may be provided from any suitable source, not shown. The means for extending and contracting the various floor, wall and roof sections may be provided by any suitable means, for example, by mechanical means, such as pulleys, levers, cranks and the like, or by pneumatic or vacuum means or the utilization of electric motors, and the like, all of which are conventional and readily available on the open market. Accordingly, no detailed description thereof is given or deemed necessary.

Figure 3:
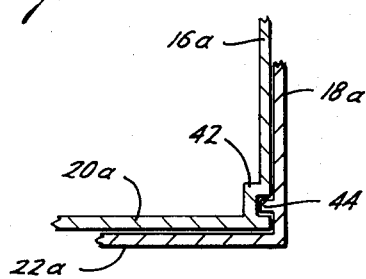
FIG. 3 is a cross-sectional view taken along the line 3—3 of FIG. 2.
Figure 4:
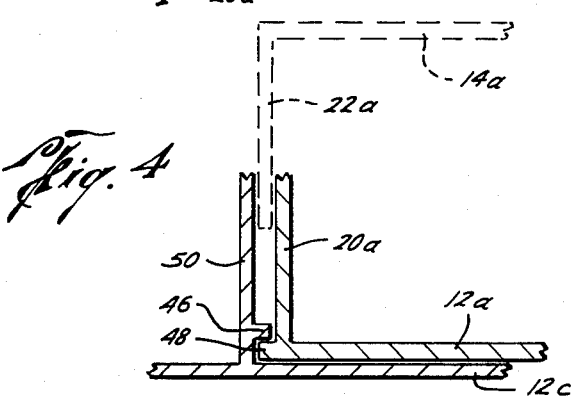
FIG. 4 is a vertical sectional view taken along the line 4—4 of FIG. 2.
Figure 7:
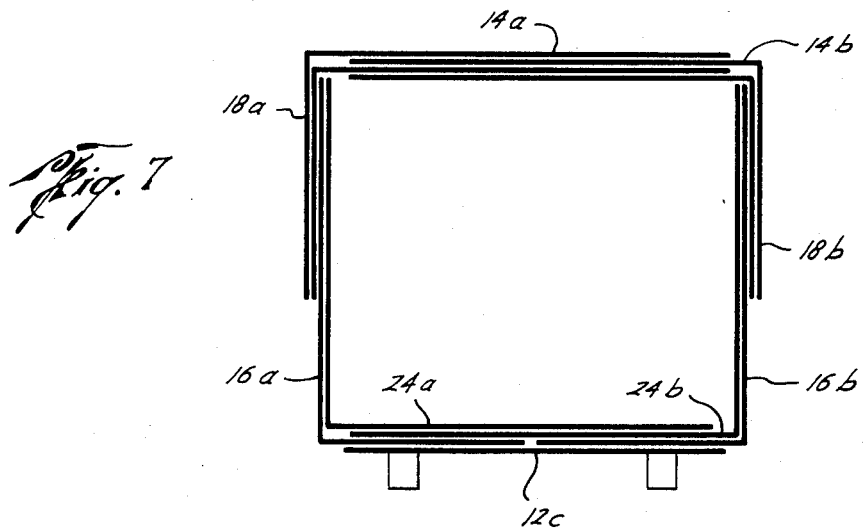
FIG. 7 is a cross-sectional view taken along the line 7—7 of FIG. 5.

Suitable interfitting guides and slides are provided which are spaced as needed to guide the expansion and contraction of the various floor, wall and roof sections. As best illustrated in FIGS. 3 and 4, the interfitting slides and guides 42 and 44 are provided for guiding vertical movement of the upper wall sections 16a and 20a. Similarly, the interfitting guides and slides 46 and 48 are illustrated for guiding the floor section 12a, wall sections 20a and 16a in their transverse sliding movement with respect to the floor section 12c. Similarly, interfitting guides and slides are utilized for guiding movement of the sections throughout their travel in expanding and contracting the mobile home, camper or trailer 10.

It is noted that in FIG. 4 a fragmentary showing of the back 50 of the cab wall 12 is illustrated.

Suitable latches or locks are provided to maintain the various sections releasably locked into position in both contracted and expanded form. These are diagrammatically illustrated in FIGS. 1 and 2 as latches 52, 54, 56 and 58. It should be understood that any desired latching means may be utilized. These may be hand operated or they may be remotely operated, for example, solenoid clamps which release before extension or contraction and reengage upon completion of the movement. Since such locks and clamps are readily available upon the market, no detailed description there of is deemed necessary or given.

It should be noted that the floor sections 12a and 12b move the lower sidewall sections 16a and 16b to expanded or contracted position. This permits various built-in appliances on the floor and lowerwall sections, which may expand into the upper-wall sections, which would include stove, cabinets, dinette, toilet, baths, closets, beds, storage compartments and the like.

While not shown, the sides may contain windows, suitable doorways and the like. The overhanging or upper portion of the roof sections 14b may be provided with a skylight and the like. Similarly, the wall, floor and roof sections may be rearranged in relation to one another for the particular adaptation or use contemplated.

The present invention, therefore, provides a compact mobile home, trailer or camper which, when in contracted position, is readily transportable on normal roads with relative ease in view of its compact height, width and length. Once upon location, the mobile home, camper or trailer may be expanded in width, height and length, as described, to provide a relatively spacious and commodious mobile home, camper or trailer.

Accordingly, the present invention attains the objects and ends and has the advantages and features mentioned as well as others inherent therein.

While a presently preferred embodiment of the invention has been given for the purpose of disclosure, changes in detail and arrangement of parts may be made which are within the spirit of the invention as defined by the scope of the appended claims.

What is claimed is:

1. Expansible and contractible mobile home, camper, trailer and the like, including,
   interfitting floor sections movable horizontally and sidewise relative to one another,
   interfitting roof sections movable horizontally and sidewise relative to one another,
   lower-sidewall sections extending upwardly from adjacent ends of the floor sections,
   upper-sidewall sections extending downwardly from adjacent ends of the roof sections and interfitting with and movable vertically relative to the lower-sidewall sections,
   end floor sections interfitting with and movable horizontally and sidewise relative to one another and interfitting with and movable horizontally and lengthwise relative to the floor sections,
   end roof sections interfitting with and movable horizontally and sidewise relative to one another and interfitting with and movable horizontally and lengthwise relative to the roof sections,
   lower-end sidewall sections extending upwardly from adjacent rear ends of the end floor sections and interfitting with and movable relative to one another and interfitting with and movable relative to the lower wall sections,
   upper-end sidewall sections extending downwardly from adjacent rear ends of the end roof sections and interfitting with and movable sidewise relative to one another and interfitting with and movable vertical relative to the lower-end sidewall sections and interfitting with and movable lengthwise relative to the upper sidewall sections,
   lower front wall sections extending upwardly from adjacent forward ends of the floor sections interfitting with and movable sidewise relative to one another and connected to forward ends of the lower sidewall sections,
   upper front wall sections extending downwardly from adjacent forward ends of the roof section interfitting with and movable sidewise relative to one another and interfitting with and movable vertically relative to the lower front wall sections and connected to forward ends of the upper sidewall sections,
   lower rear wall sections extending upwardly from adjacent rear ends of the end floor sections interfitting with and movable sidewise relative to one another,
   upper rear wall sections extending downwardly from adjacent rear ends of the end roof sections interfitting with and movable sidewise relative to one another and interfitting with and movable vertically relative to the lower rear wall sections, and
   means for moving these sections to expanded and contracted positions.

2. The invention of claim 1 including,
   interfitting guides and slides on the sections arranged to guide the moving of the sections to expanded and contracted positions.

3. The invention of claim 1 including,
   releasable clamps arranged to releasably secure the sections in the expanded and contracted positions.

4. The invention of claim 3 where,
   the means for the moving of the sections to expanded and contracted positions comprise hydraulic means.

* * * * *